(12) United States Patent
Maslov et al.

(10) Patent No.: US 6,617,746 B1
(45) Date of Patent: Sep. 9, 2003

(54) ROTARY ELECTRIC MOTOR HAVING AXIALLY ALIGNED STATOR POLES AND/OR ROTOR POLES

(75) Inventors: Boris A. Maslov, Reston, VA (US); Zareh Soghomonian, Reston, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 09/966,101

(22) Filed: Oct. 1, 2001

(51) Int. Cl.[7] ................................................ H02K 3/00
(52) U.S. Cl. .................. 310/254; 310/218; 310/156.12; 310/156.43; 310/267
(58) Field of Search ................................ 310/216, 217, 310/218, 254, 258, 91, 156.12, 156.13, 156.43; 29/596–598

(56) References Cited

U.S. PATENT DOCUMENTS

| | | | | |
|---|---|---|---|---|
| 4,012,651 A | * | 3/1977 | Burson | 310/156 |
| 4,549,104 A | * | 10/1985 | Niimura et al. | 310/156 |
| 4,754,207 A | | 6/1988 | Heidelberg et al. | |
| 4,786,834 A | * | 11/1988 | Grant et al. | 310/194 |
| 4,835,431 A | * | 5/1989 | Lindgren | 310/254 |
| 5,095,238 A | * | 3/1992 | Suzuki et al. | 310/156 |
| 5,164,623 A | | 11/1992 | Shkondin | |
| 5,196,749 A | * | 3/1993 | Palma et al. | 310/217 |
| 5,258,697 A | | 11/1993 | Ford et al. | |
| 5,365,137 A | * | 11/1994 | Richardson et al. | 310/258 |
| 6,188,159 B1 | * | 2/2001 | Fan | 310/254 |
| 6,323,576 B1 | * | 11/2001 | Applegate | 310/268 |
| 6,373,161 B1 | * | 4/2002 | Khalaf | 310/254 |
| 6,384,503 B1 | * | 5/2002 | Iwaki et al. | 310/156.47 |

FOREIGN PATENT DOCUMENTS

| | | |
|---|---|---|
| EP | 0 790 695 A1 | 8/1997 |
| EP | 1 130 748 A1 | 9/2001 |
| GB | 628763 | 9/1949 |

* cited by examiner

*Primary Examiner*—Tran Nguyen
(74) *Attorney, Agent, or Firm*—McDermott, Will & Emery

(57) ABSTRACT

A rotary electric motor comprises a rotor having a plurality of permanent magnet elements disposed in an annular ring configuration about an axis of rotation, the magnet elements successively alternating in magnetic polarity along an inner annular surface, and a stator spaced from the rotor by a radial air gap. The stator includes a plurality of magnetic core segments having respective coils wound thereon to form stator windings, the core segments separated from direct contact with each other and disposed along the radial air gap. Each stator segment comprises a pair of poles aligned with each other in a direction parallel to the axis of rotation. Thus the stator comprises a first set of stator poles in radial alignment and an axially displaced second set of stator poles in radial alignment.

26 Claims, 9 Drawing Sheets

ROTARY ELECTRIC MOTOR HAVING AXIALLY ALIGNED STATOR POLES AND/OR ROTOR POLES

RELATED APPLICATIONS

This application contains subject matter related to copending U.S. application Ser. No. 09/826,423 of Maslov et al., filed Apr. 5, 2001, and copending U.S. application Ser. No. 09/826,422 of Maslov et al., filed Apr. 5, 2001, both commonly assigned with the present application. The disclosures of both of these applications are incorporated by reference herein.

FIELD OF THE INVENTION

The present invention relates to rotary electric motors, more particularly to motors having a plurality of rotor elements and stator elements comprising a plurality of poles that are aligned in a direction parallel to the axis of rotation of the motor.

BACKGROUND

The progressive improvement of electronic systems, such as microcontroller and microprocessor based applications for the control of motors, as well as the availability of improved portable power sources, has made the development of efficient electric motor drives for vehicles, as a viable alternative to combustion engines, a compelling challenge. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved. The use of permanent magnets in conjunction with such windings is advantageous in limiting current consumption.

The above-identified copending related U.S. patent application of Maslov et al., Ser. No. 09/826,423, identifies and addresses the need for an improved motor amenable to simplified manufacture and capable of efficient and flexible operating characteristics. In a vehicle drive environment, it is highly desirable to attain smooth operation over a wide speed range, while maintaining a high torque output capability at minimum power consumption. Such a vehicle motor drive should advantageously provide ready accessibility to the various structural components for replacement of parts at a minimum of inconvenience. The copending related U.S. application incorporates electromagnet poles as isolated magnetically permeable structures configured in an annular ring, relatively thin in the radial direction, to provide advantageous effects. With this arrangement, flux can be concentrated, with virtually no loss or deleterious transformer interference effects in the electromagnet cores, as compared with prior art embodiments. While improvements in torque characteristics and efficiency are attainable with the structure of the identified copending application, further improvements remain desirable.

To this end, the above-identified copending related U.S. patent application of Maslov et al., Ser. No. 09/826,423, seeks to optimize rotor parameters such as the grade of the magnet, the energy density and the overall magnetic characteristics of the magnet grade, the size and the dimensions of the magnet that can adjust the effective working permeance and the overall operating condition of the magnet when it is part of the rotor, the temperature stability of the magnet, the finishing, coating and post processing steps taken in manufacturing of the magnets for the intended application, the stability of the magnetization over the curvilinear surface of the magnet, uniformity of the radial polarization of the magnet, the adjacent gap between two separate magnets, the mechanical features of the edges of the magnets, and the return flux path of the magnet as provided by a back iron ring section.

The Maslov et al. applications recognize that isolation of the electromagnet groups permits individual concentration of flux in the magnetic cores of the groups, with virtually no flux loss or deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group eliminates avoids any such effects within a group.

While significant advancements have been derived from the above described efforts, it has been found that potential benefits to be gained from utilization of three dimensional aspects of motor structure have not been fully realized. In the motors of the copending applications, all stator and rotor poles are circumferentially located about the rotational axis and are coextensive in the axial direction. For a given air gap diameter, the total number of poles, twice the number of pole pairs, is limited by practical physical capabilities. The optimum active surface area of the individual poles that produce flux interaction between rotor and stator is thereby determined, as well as the number of poles that produce such interaction. A structural configuration in which flux distribution is more highly concentrated, while providing a greater number of poles with the same individual active air gap surface areas and/or greater total active air gap surface area for a motor with the same air gap diameter would be highly desirable to obtain even greater performance.

DISCLOSURE OF THE INVENTION

The present invention furthers the above-described needs of the prior art and provides additional advantages for configurations such as the isolated individual pole pair arrangements disclosed in the above identified Maslov et al. applications.

Advantages of the present invention are achieved, at least in part, by extending the radial flux distribution interaction between stator and rotor poles along the axial direction of the motor.

Additional advantages of the present invention can be realized from the use of materials by which a soft magnetically permeable medium is amenable to formation of a variety of particular shapes. For example, core material may be manufactured from soft magnet grades of Fe, SiFe, SiFeCo, SiFeP powder material, each of which has a unique power loss, permeability and saturation level. Core geometries and core dimensions of stator elements, with relevant tolerances, can be formed without the need to form laminations and thus optimize the magnetic potential gradient developed between coupled poles of rotor permanent magnets and stator electromagnets.

The aforementioned advantages are manifested in structural features of the invention, at least in part, wherein the motor comprises a rotor and stator each disposed in an angular ring configuration and spaced from each other by an annular air gap. The stator comprises a plurality of magnetically permeable core segments with coils wound thereon, the core segments being separated from direct contact with each other and disposed along the radial air gap. Each stator segment comprises a pair of poles aligned with each other in a direction parallel to the axis of rotation. The stator thus has two sets of axially displaced poles, the poles of each set being in axial alignment. Each core segment pole pair thus comprises a pole of one of the sets structurally connected with a corresponding pole of the other set. In this arrangement, the total number of pole pairs is equal in number to the number of poles in a set. Preferably, the poles of each stator core segment is joined by a linking portion. The stator winding may be formed on the linking portion, whereby application of current to the winding effects opposite magnetic polarities in the pole pairs. Alternatively, the winding may comprise two sets of coils wound respectively in opposite directions to each other on corresponding poles of the stator pole pair and which may be connected in series or parallel, whereby application of current to the connected coil sets effects magnetization of the poles of the stator core segment in opposite magnetic polarity. In either alternative, reversal of the current applied to the winding will result in reversal of the magnetic polarity of the stator poles.

The rotor preferably comprises a plurality of permanent magnet elements successively alternating in magnetic polarity along its inner annular surface. Each rotor element comprises a pair of poles aligned with each other at the air gap in a direction parallel to the axis of rotation, the poles having opposite magnetic polarities. Thus, the rotor also has two sets of axially displaced poles with the poles of each set in axial alignment. The sets of rotor poles preferably are axially coextensive, and in axial alignment, with corresponding stator pole sets.

Another advantage of the present invention can be attributed to rotor structure that is configured to enhance the direction of magnetic flux in the radial direction across the air gap. For example, each rotor pole may be magnetized to exhibit one magnetic polarity at the air gap at its inner pole surface and an opposite magnetic polarity at its outer pole surface to concentrate the magnetic flux in the radial direction. The rotor elements may be contiguous to each other and mounted on a ferromagnetic annular back plate. Preferably, the rotor elements are not in direct contact with each other to thereby enhance isolation of the magnetic paths. Alternatively, each rotor magnetic element may further comprise a magnetically permeable section extending along the axial direction as a magnetic back plate, each pole of the rotor element mounted at a respective axial end of the back plate. In this arrangement, a separate back plate portion is provided for each rotor element, rather than a continuous magnetic annular back plate, thereby to avoid stray flux distribution. In either embodiment, a non-ferromagnetic annular back plate is provided to surround the rotor elements.

In yet another preferred embodiment, each rotor permanent magnetic element further comprises an additional magnet portion between the pole portions of the element, the additional magnetic portion directing flux between the pole portions of the element in the axial direction, thus further improving the active flux distribution pattern.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
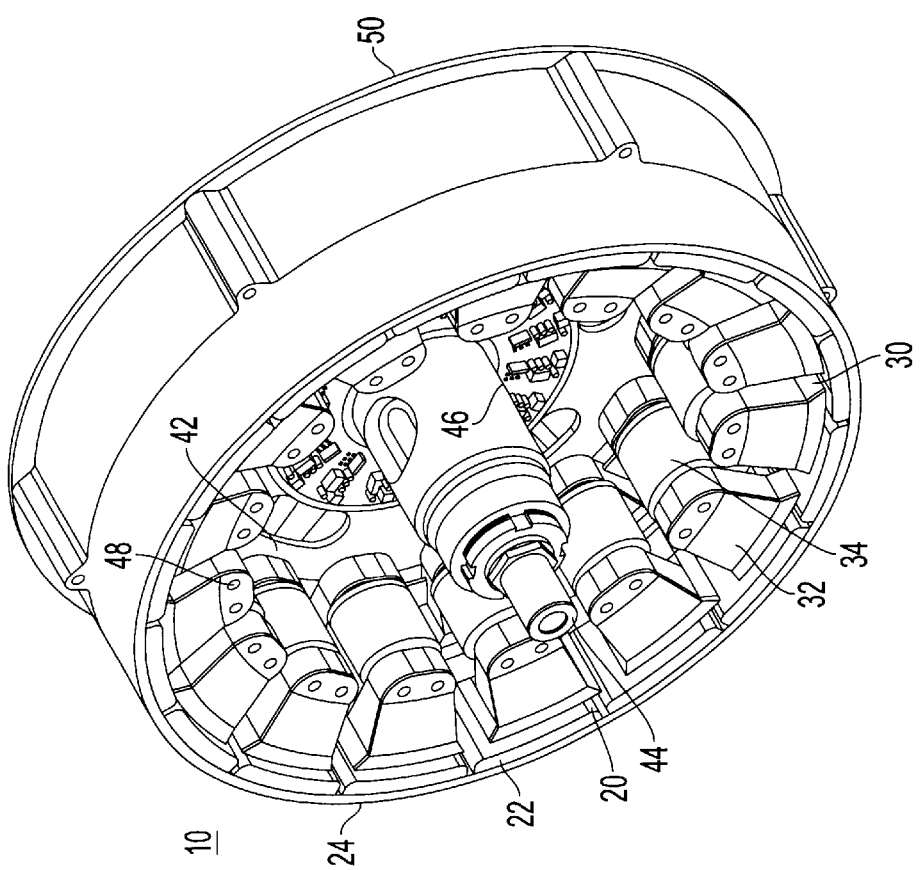
FIG. 1 is a partial three dimensional perspective diagram of a motor according to the present invention.

The motor of the present invention is suitable for use in driving a vehicle wheel of an automobile, motorcycle, bicycle, or the like. The drawing illustrations thus depict motor structure that can be housed within a vehicle wheel, the stator rigidly mounted to a stationary shaft and surrounded by a rotor for driving the wheel. It should be appreciated, however, that the vehicle context is merely exemplary of a multitude of particular applications in which the motor of the present invention may be employed.

As shown in the cutaway drawing of FIG. 1, motor 10 comprises annular permanent magnet rotor 20 and annular stator structure 30 separated by a radial air gap. The stator comprises a plurality of ferromagnetically isolated elements. Core segments 32, made of magnetically permeable material and isolated from direct contact with each other, have respective windings 34 formed thereon. The rotor comprises a plurality of permanent magnets 22, circumferentially distributed about the air gap and affixed to a non-magnetic annular back plate 24, which may be formed of aluminum or other non magnetically permeable material. The flux distributions produced by the rotor magnets can be further enhanced by provision of a magnetically permeable element mounted to the back of the rotor magnets. Although not shown in the embodiment of FIG. 1, an additional annular ferromagnetic back layer for the rotor magnets is illustrated in other figures.

Within the cylindrical annular rotor structure, the stator core segments are rigidly secured by two plates 42, only one of which is shown in the drawing. Each plate is of a rigid circular configuration having an outer diameter and a circular cutout portion at its center that forms an inner diameter. The inner diameter is sized to fit a stationary shaft 44 and to be affixed to a member 46 integral with the shaft. Along the plate periphery, the plate is provided with holes, not shown, appropriately spaced to mate with corresponding through holes 48 in the stator core segments. Each of the plates is secured to the shaft and spaced from each other appropriately to be secured to, and to sandwich, the stator core segments at each axial side thereof via the mating holes. Thus an annular ring is formed of stator core segments that are coextensively aligned in the axial direction across the air gap from the rotor.

The stationary shaft, plates and stator structure, are contained within a housing 50, to which the annular rotor backplate and permanent magnets are attached. The housing is journalled to the shaft on the outside of the plates through appropriate bushings and bearings. It is to be understood that any appropriate means well known in the art can be used for assembly of the various elements. In the vehicle example, the housing may form portions of a vehicle wheel that rotates with the rotor about the shaft. The specific configuration of the plates is described above merely by way of example, as any means of securing the parts of the stator to the shaft while forming an annular arrangement would be appropriate.

Figure 2:
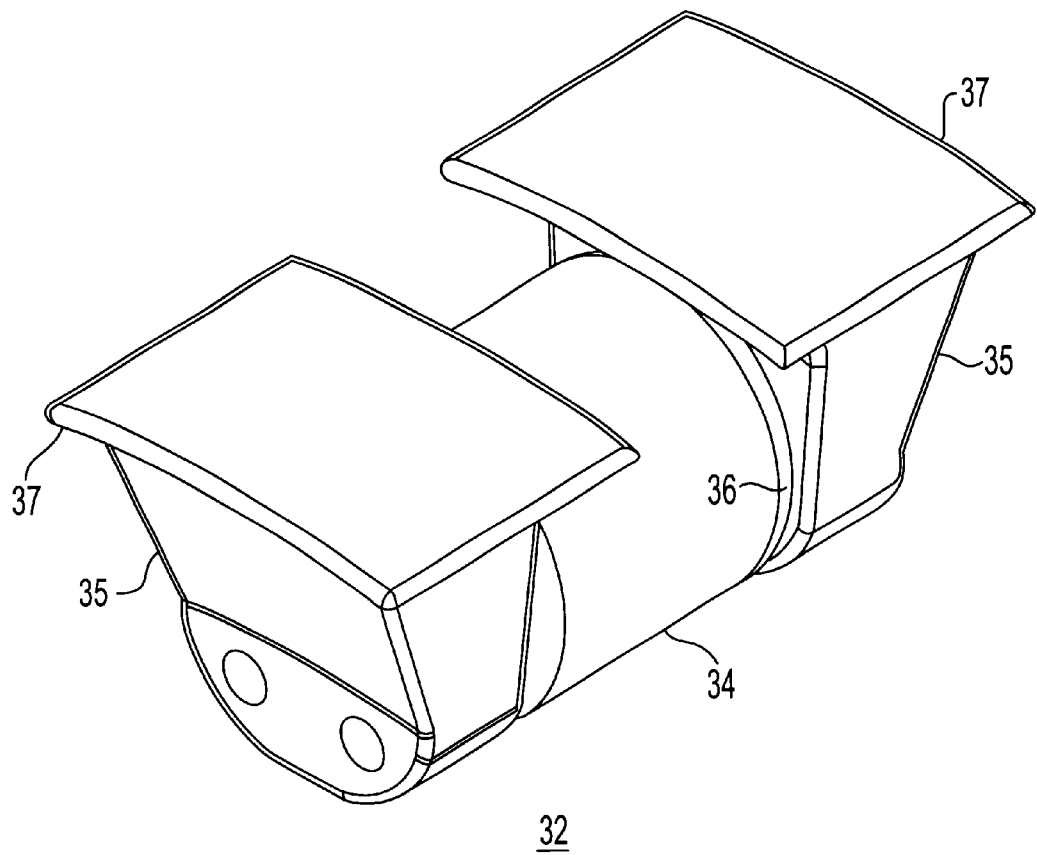
FIG. 2 is a perspective view of a stator core segment of the motor of FIG. 1 wherein coils are wound around a linking portion connecting the segment poles.

A core segment of the stator is shown in more detail in FIG. 2. The core segment is a unitary magnetic structure that comprises two poles 35 joined in the axial direction by a linking portion 36, about which stator coils 34 are wound. The poles have tapered configurations in which the cross sectional area increases in the radial direction toward the air gap, culminating in enlarged pole face surfaces 37. This configuration optimizes the concentration of flux in the core so that maximum flux can be directed in across the air gap. The illustrated core geometry, as well as variations thereof, may be formed using powder metal technology from soft magnet grades, for example, of Fe, SiFe, SiFeCo, or SiFeP powder material. Powder metal technology provides a flexibility of construction design that is not available from the conventional formation of stacked metal laminations. Minimization of eddy current losses, conventionally addressed by the use of laminated cores, is obtained by selection of the appropriate powder metal material composition in accordance with the known high electrical resistivity of powder metal materials.

Energization of stator winding 34 effects magnetization of the core section 32 with opposite magnetic polarity at pole faces 37. Reversal of the direction of current, in known manner, effects reversal of the magnetic polarities. Alignment of each pole pair in the axial direction, rather than circumferentially about the air gap in prior arrangements, provides twice the number of stator poles, with each having the same surface area because the axial extent of the stator core is greater in the present invention. The complete stator thus contains two sets of axially coextensive poles that are axially displaced from each other by the linking portions of the core elements.

Figure 3:
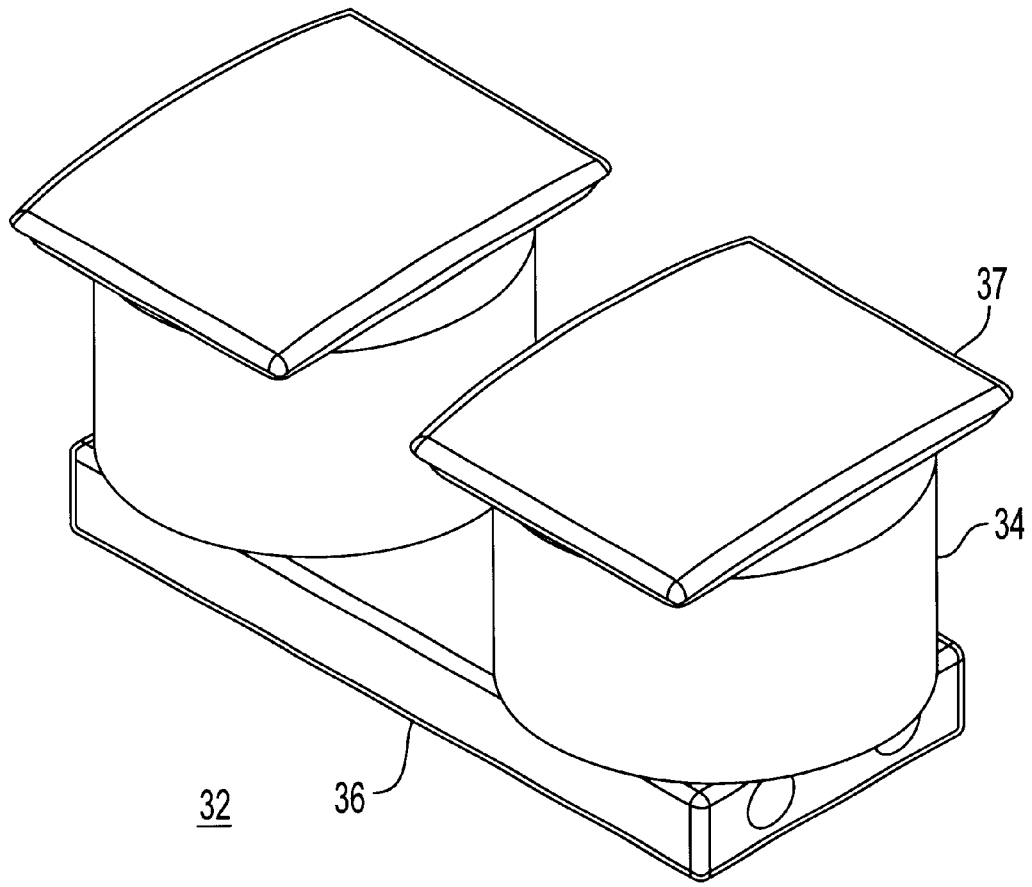
FIG. 3 is a perspective view of a stator core segment of the present invention wherein coils are wound around stator poles.

FIG. 3 illustrates a variation of the stator core segment shown in FIG. 2. The core segment 32 comprises bobbin shape pole sections, each wound with coils 34. The pole sections have enlarged pole face surfaces 37 at the air gap and are joined at the ends opposite the air gap by relatively flat linking portion 36. The pole sections, pole faces and linking portions are of unitary construction, preferably formed from powder metal material. Each pole of the pole pair is oppositely wound to provide opposite magnetic polarities at the pole faces 37. The two winding portions may be connected in series or parallel, depending upon desired performance characteristics. The winding portions are appropriately connected electrically so that application of energization current to the winding effects opposite magnetization polarity in the poles of the core segment. Reversal of the current will reverse the magnetic polarities in known manner.

Figure 4A:
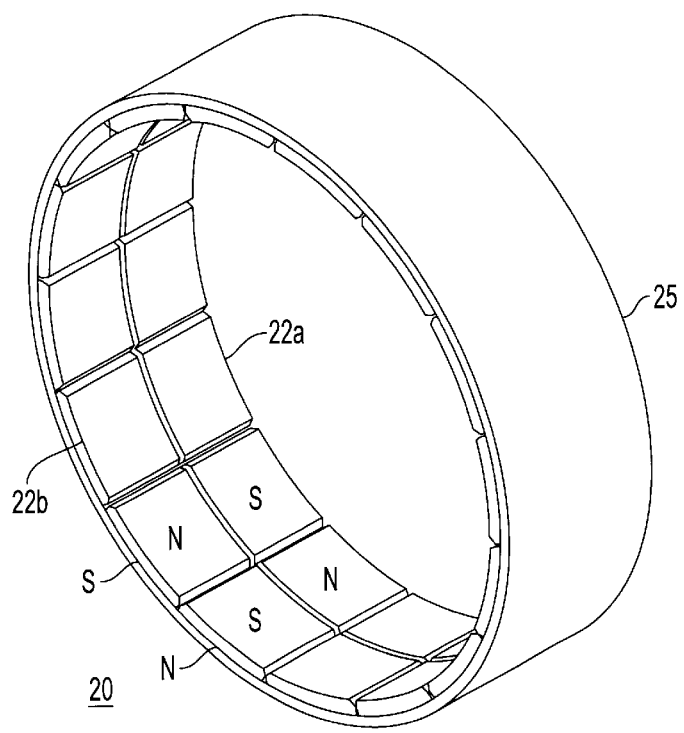
FIGS. 4a and 4b are perspective views of a rotor of the present invention in which axially aligned pole pairs are structurally separated.
Figure 4B:
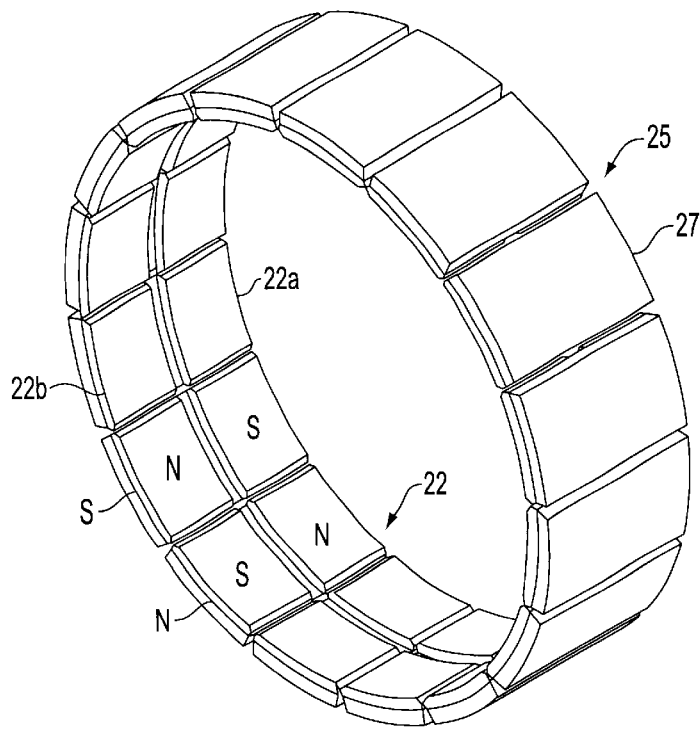

Rotor 20 is illustrated in more detail in FIGS. 4a and 4b. FIG. 4a illustrates a continuous magnetic annular back plate 25 upon which are mounted the individual permanent magnets. The magnets form a first ring of axially coextensive magnets 22a and a second ring of axially coextensive magnets 22b. Each magnet has a north-south magnetization orientation in the radial direction, the polarity at the surface facing the air gap opposite to the polarity of the surface in contact with back plate 25. The magnets of each ring successively alternate in magnetic polarity. Magnets 22a are coextensive with magnets 22b in the circumferential direction, the magnets alongside each other being of opposite polarity. The spacing between ring of magnets 22a and the ring of magnets 22b is related, although not necessarily equal, to the spacing the between stator pole pair surfaces. The spacing between magnets within each of the rings is uniform and related to the spacing between pole surfaces of adjacent stator core elements. The individual magnets are of uniform surface area, which may be related to surface area of the stator poles. Each axially adjacent pair of magnets 22a and 22b can thus be considered a rotor permanent magnet pole pair that interacts with a stator core element pole pair to effect motor rotation. The interaction will cause a significant increase in the effective flux density in the air gap while preventing saturation of flux in the back iron.

In the arrangement illustrated in FIG. 4b, the magnetic annular back plate 25 is segmented into strips 27. Attached to each strip is an axially aligned permanent magnet pair. Spacing between the strips provides improved magnetic flux distribution for the respective individual permanent magnet pairs. Direct losses of stray flux and interference, or crosstalk, between adjoining units are minimized because each axial magnetic unit is structurally disjointed.

Figure 5A:
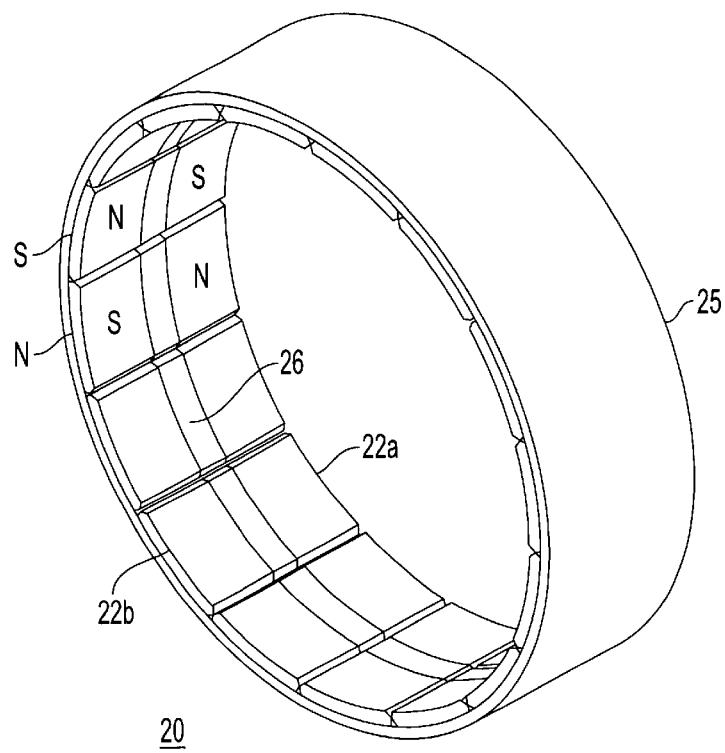
FIGS. 5a and 5b are perspective views of a rotor of the present invention wherein axially magnetized permanent magnets are located between the axially aligned rotor pole pairs.
Figure 5B:
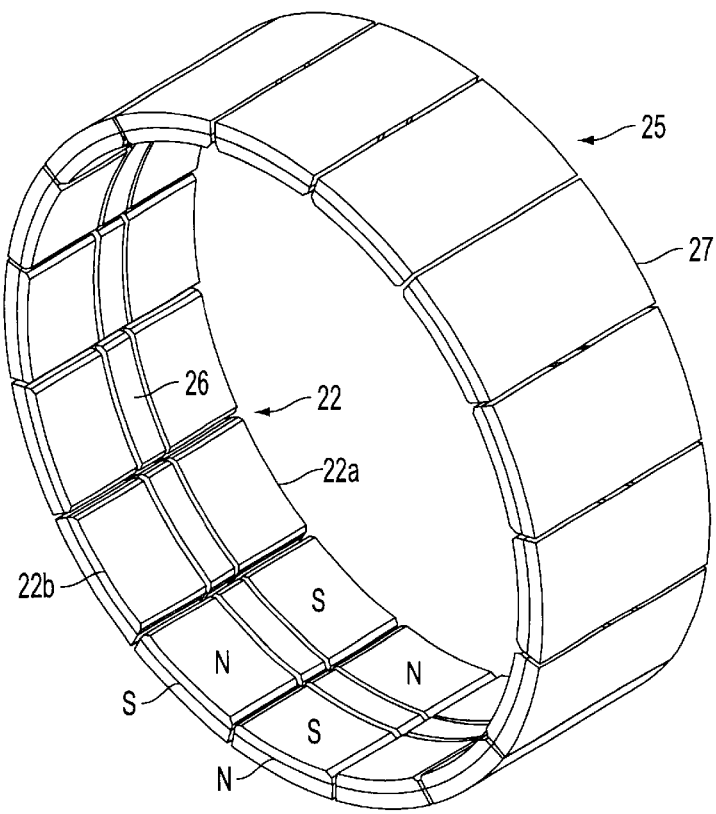

FIGS. 5a and 5b illustrate variations of the rotor of the present invention. In the rotor arrangement of FIG. 5a, axially magnetized permanent magnets 26 are located between the axially aligned rotor pair magnets 22a and 22b. North-south magnetization orientation of magnets 22a and 22b is in the radial direction. This structure differs from the rotor of FIG. 4a in that magnet 22a and 22b is each in contact with one end of magnet 26 to form an individual rotor axial unit, whereas the magnets 22a and 22b of FIG. 4a are separated from each other. Magnet 26 is magnetized in the axial direction to aid concentration of the flux between magnets 22a and 22b. As in FIG. 4a, magnetic annular back plate 25 is continuous. In the rotor arrangement of FIG. 5b, the magnetic annular back plate 25 is segmented. Each back plate strip 27, upon which a rotor axial unit is mounted, is separated from an adjacent strip to improve flux distribution.

Figure 6A:
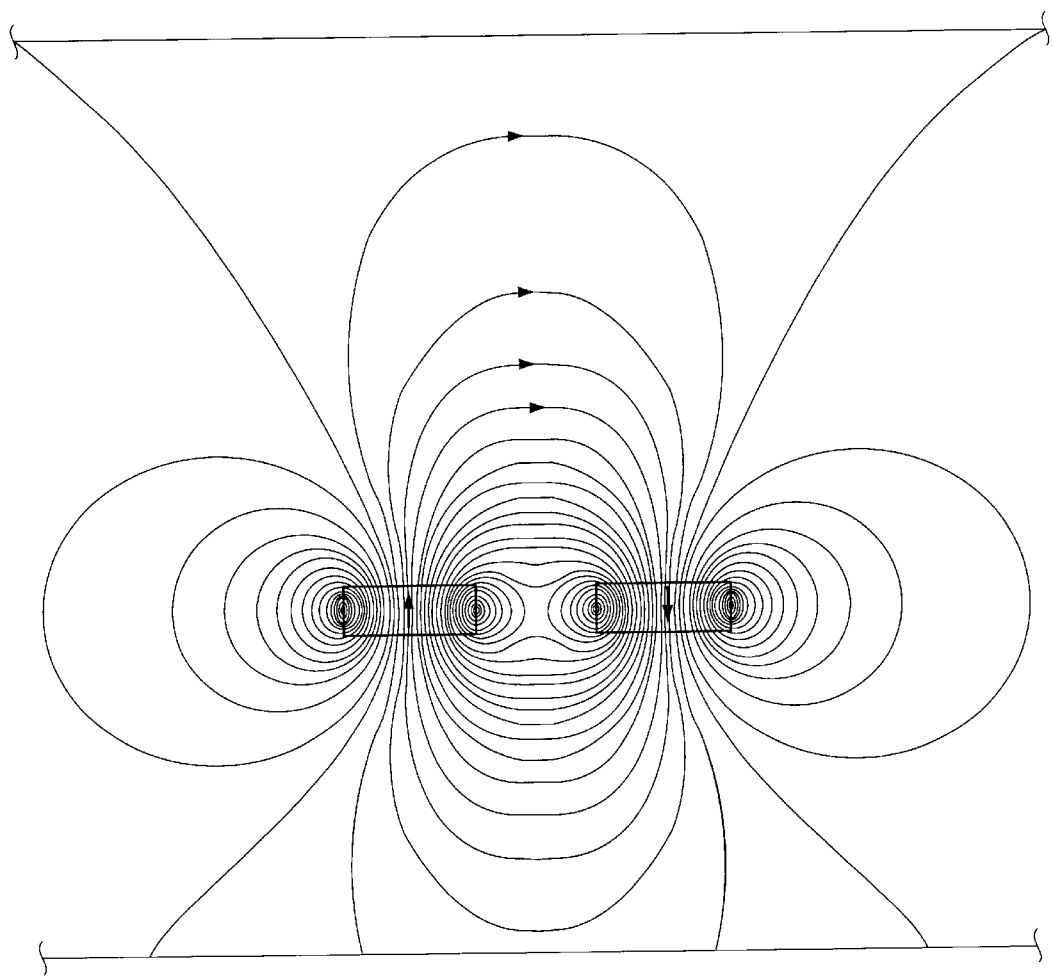
FIGS. 6a–6d are diagrams illustrating various flux distribution patterns for respective variations of axial rotor magnet units.
Figure 6B:
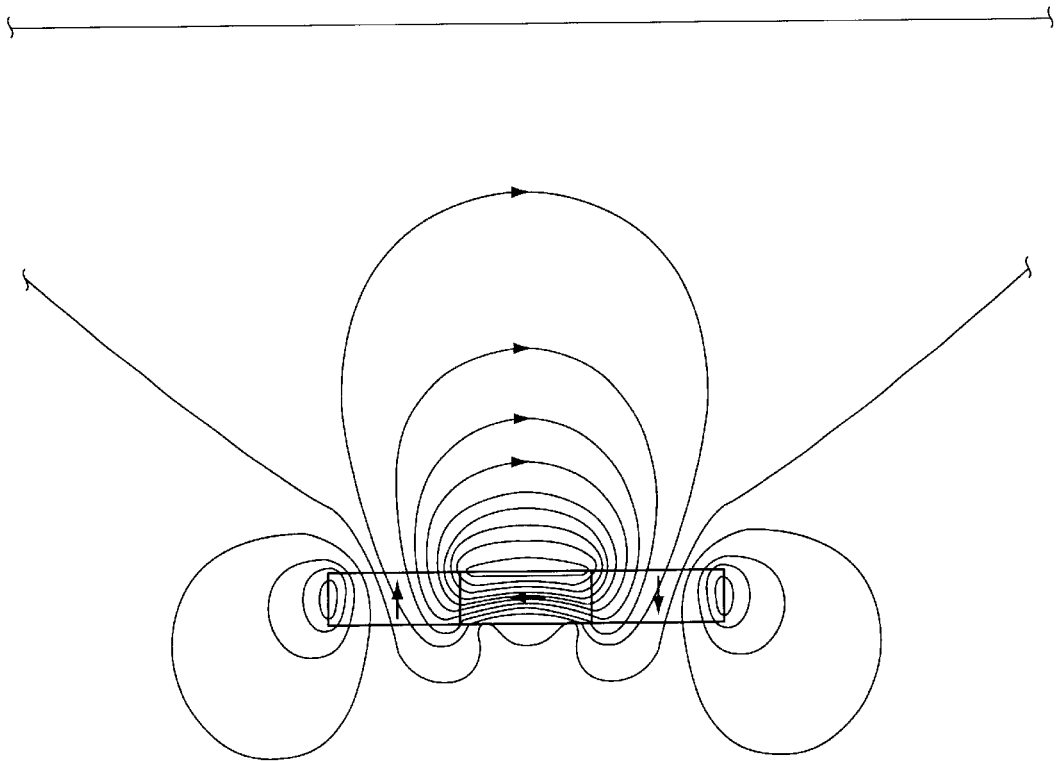
Figure 6C:
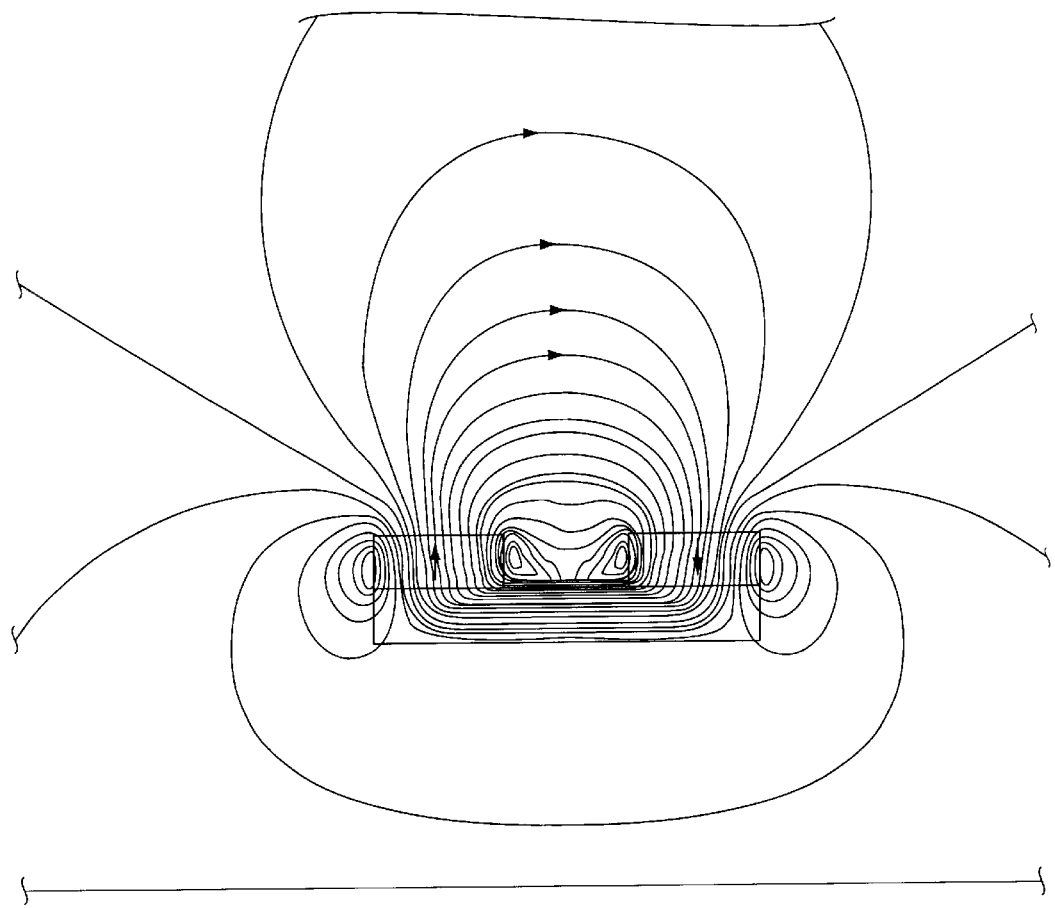
Figure 6D:
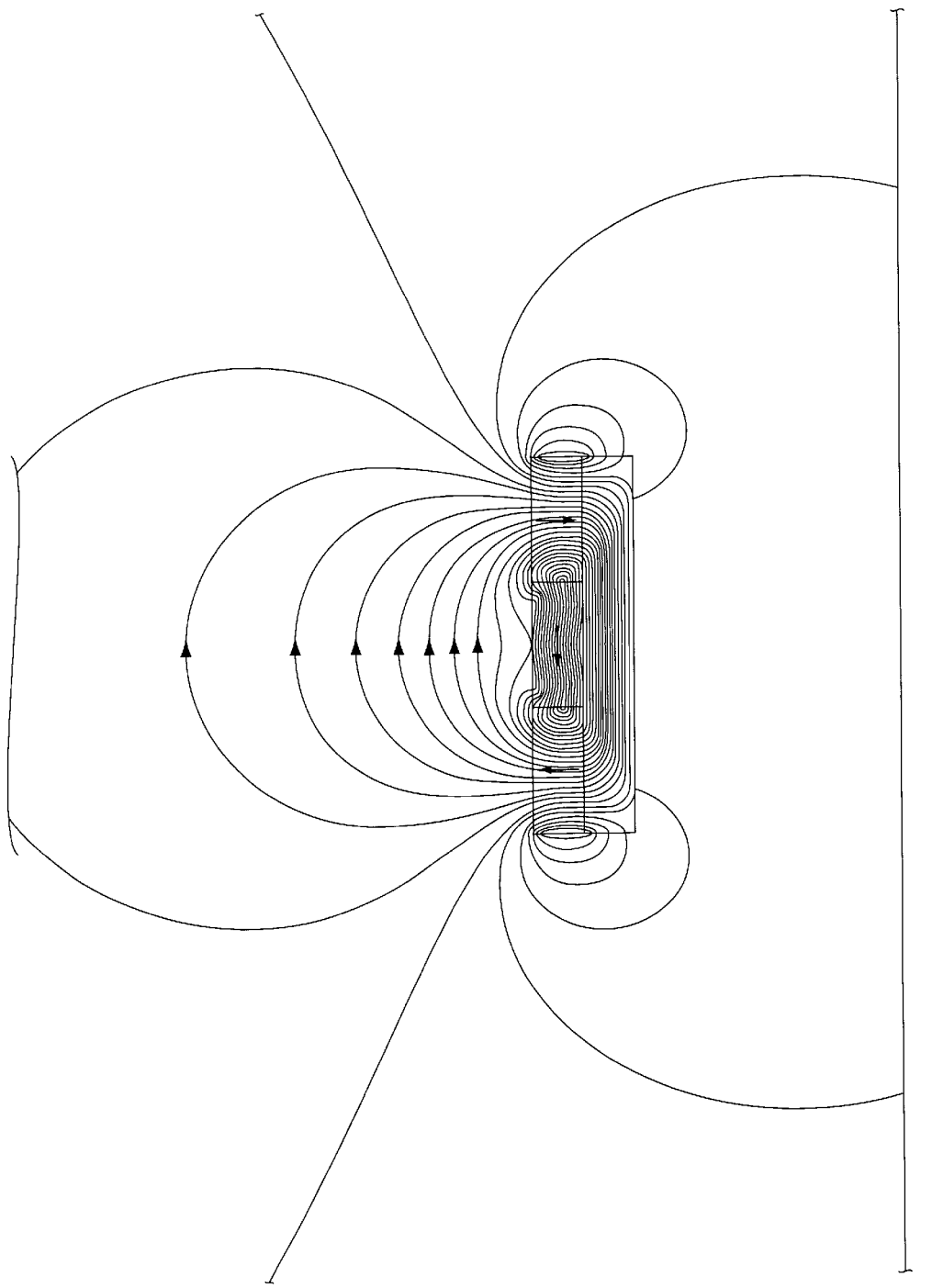

Various flux distribution patterns are illustrated in FIGS. 6a–6d. The flux distribution of FIGS. 6a and 6b correspond to rotor arrangements wherein the permanent magnets are in direct contact with a non-ferromagnetic back plate 24 (not shown). FIG. 6a shows a flux distribution pattern for spaced individual permanent magnets of opposite magnetic polarity mounted directly to the non-ferromagnetic back plate. FIG. 6b shows a flux distribution pattern for a three magnet axial unit, wherein an axially magnetized magnet is sandwiched between magnets of opposite magnetic polarity that have a radial magnetic orientation. FIG. 6c shows a flux distribution pattern for rotor configurations in which individual permanent magnets of opposite polarity are spaced from each other and mounted on magnetic back iron portions, such as the arrangements of FIGS. 4a and 4b. FIG. 6d shows a flux distribution pattern for rotor configurations in which three magnet axial units are mounted on back iron portions, such as the arrangements of FIGS. 5a and 5b. As evident from these diagrams, the pattern for the three magnet arrangement is an improvement with respect to the arrangement of two separate magnets, and the patterns of both of these arrangements are improved with the addition of the magnetic back iron elements.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, as can be appreciated, the motor of the invention can be utilized in a wide range of applications in addition to vehicle drives. While it is preferred, in the implementation of a vehicle drive, that the rotor surround the stator, other applications may find advantageous utility with the stator surrounding the rotor. Thus, it is within the contemplation of the invention that each inner and outer annular member may comprise either the stator or rotor and may comprise either the group of electromagnets or group of permanent magnets.

While specific geometric configurations of the stator core elements have been illustrated, it should be recognized that the inventive concept herein encompasses a multitude of variations of these configurations as virtually any shape can be formed using the powder metal technology. Thus a specific core configuration can be tailored to the flux distribution desired.

In addition, the various pole surface areas and spacing relationships among stator and rotor pole surfaces are subject to variation in dependence upon the desired operational functionality. For example, the spacing between elements and element surface areas need not be uniform. In the various embodiments described above, various rotor magnets may be further separated from each other than indicated or, conversely, formed in contact with each other. In the three magnet axial unit arrangement of FIGS. 5a and 5b, the magnetic unit may be fabricated from a single integral magnetic block, with appropriate embedded magnetic patterns.

What is claimed is:

1. A rotary electric motor comprising:
   a rotor comprising a plurality of permanent magnet elements disposed in an annular ring configuration about an axis of rotation and a cylindrical backplate, the magnet elements successively alternating in magnetic polarity along an inner annular surface of the backplate; and
   a stator spaced from the rotor by a radial air gap, the stator including a plurality of ferromagnetic core segments having respective coils wound thereon to form stator windings, the core segments separated from direct contact with each other and disposed along the radial air gap, each stator segment comprising a pair of poles aligned with each other in a direction parallel to the axis of rotation, the stator thereby comprising a first set of stator poles in radial alignment and an axially displaced second set of stator poles in radial alignment.

2. A rotary electric motor as recited in claim 1, wherein at least one set of the first and second sets of stator poles is radially aligned with the annular ring permanent magnet elements of the rotor across the air gap.

3. A rotary electric motor as recited in claim 2, wherein each of the rotor permanent magnet elements is an individual axial unit comprising a pair of permanent magnet poles aligned with each other at the air gap in a direction parallel to the axis of rotation, the permanent magnet poles having magnetic polarities opposite to each other; and
   wherein each set of the first and second sets of stator poles is radially aligned with a respective set of rotor magnet poles.

4. A rotary electric motor as recited in claim 3, wherein each stator core segment comprises a linking portion joining the pair of poles and the winding is formed on the linking portion, whereby reversal of direction of current flow through the winding effects reversal of magnetic polarities of the pole pairs.

5. A rotary electric motor as recited in claim 4, wherein each permanent magnet pole exhibits one magnetic polarity at the air gap at a radially inner pole surface and an opposite magnetic polarity at a radially outer pole surface, whereby magnetic flux is directed in a radial direction.

6. A rotary electric motor as recited in claim 5, wherein the poles of each rotor axial unit are separated from each other.

7. A rotary electric motor as recited in claim 6, wherein each rotor axial unit further comprises a magnetically permeable section extending in the axial direction, mounted to the radially outer pole surface of each pole of the unit.

8. A rotary electric motor as recited in claim 7, wherein the magnetically permeable sections of all rotor axial units are structurally spaced from each other.

9. A rotary electric motor as recited in claim 6, wherein each rotor axial unit further comprises a third magnet extending in the axial direction between the pair of poles and having a magnetic polarity orientation in the axial direction, whereby flux distribution is enhanced.

10. A rotary electric motor as recited in claim 9, wherein each rotor axial unit further comprises a magnetically permeable section extending in the axial direction, mounted to the radially outer pole surface of each pole of the unit.

11. A rotary electric motor as recited in claim 10, wherein the magnetically permeable sections of all rotor axial units are structurally spaced from each other.

12. A rotary electric motor as recited in claim 3, wherein the winding of each stator core segment comprises two sets of coils wound respectively in opposite directions to each other on corresponding poles of the stator pole pair whereby application of current to the coil sets effects magnetization of the poles of the stator core segment in opposite magnetic polarity.

13. A rotary electric motor as recited in claim 12, wherein each pole permanent magnet exhibits one magnetic polarity at the air gap at a radially inner pole surface and an opposite magnetic polarity at a radially outer pole surface, whereby magnetic flux is directed in a radial direction.

14. A rotary electric motor as recited in claim 13, wherein the poles of each rotor axial unit are separated from each other.

15. A rotary electric motor as recited in claim 14, wherein each rotor axial unit further comprises a magnetically permeable section extending in the axial direction, mounted to the radially outer pole surface of each pole of the unit.

16. A rotary electric motor as recited in claim 15, wherein the magnetically permeable sections of all rotor axial units are structurally spaced from each other.

17. A rotary electric motor as recited in claim 14, wherein each rotor axial unit further comprises a third magnet extending in the axial direction between the pair of poles and having a magnetic polarity orientation in the axial direction, whereby flux distribution is enhanced.

18. A rotary electric motor as recited in claim 17, wherein each rotor axial unit further comprises a magnetically permeable section extending in the axial direction, mounted to the radially outer pole surface of each pole of the unit.

19. A rotary electric motor as recited in claim 18, wherein the magnetically permeable sections of all rotor axial units are structurally spaced from each other.

20. A rotary electric motor as recited in claim 1, wherein the rotor surrounds the stator.

21. A rotary electric motor as recited in claim 5, wherein each rotor axial unit is attached to a non-ferromagnetic back plate concentric with the axis of rotation.

22. A rotary electric motor as recited in claim 21, wherein the plurality of rotor axial units are spaced from each other along the back plate.

23. A rotor for a rotary electric motor comprising:
   a plurality of permanent magnet elements disposed in an annular ring configuration about an axis of rotation, the magnet elements successively alternating in magnetic polarity along an inner annular surface; and
   wherein each of the rotor permanent magnet elements is an individual axial unit comprising a pair of permanent magnet poles aligned with each other in a direction parallel to the axis of rotation, the permanent magnet poles having magnetic polarities opposite to each other; and
   each permanent magnet pole exhibits one magnetic polarity at the inner annular surface and an opposite magnetic polarity at an outer annular pole surface, whereby magnetic flux is directed in a radial direction.

24. A rotor as recited in claim 23, wherein each rotor axial unit further comprises a magnetically permeable section extending in the axial direction, mounted to the radially outer pole surface of each pole of the unit, whereby flux distribution is enhanced.

25. A rotary as recited in claim 23, wherein each rotor axial unit further comprises:
   a third magnet located between the pair of poles and having a magnetic polarity orientation in the axial direction.

26. A rotor as recited in claim 25, wherein each rotor axial unit further comprises a magnetically permeable section extending in the axial direction, mounted to the radially outer pole surface of each pole of the unit, whereby flux distribution is enhanced.

* * * * *